United States Patent
Zhang

(10) Patent No.: US 6,493,620 B2
(45) Date of Patent: Dec. 10, 2002

(54) MOTOR VEHICLE OCCUPANT DETECTION SYSTEM EMPLOYING ELLIPSE SHAPE MODELS AND BAYESIAN CLASSIFICATION

(75) Inventor: Jun Zhang, Shorewood, WI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/837,012

(22) Filed: Apr. 18, 2001

(65) Prior Publication Data

US 2002/0169532 A1 Nov. 14, 2002

(51) Int. Cl.[7] .......................... B60R 22/00; G06K 9/34; G01C 22/00
(52) U.S. Cl. .......................... 701/45; 701/28; 382/175; 382/199; 382/203; 382/209
(58) Field of Search .............................. 701/45, 46, 28; 280/734, 735; 382/100, 104, 156, 190, 173, 175, 180, 209, 224, 103, 107, 203, 123, 199; 356/4.07, 5.05; 348/77, 155; 180/271, 273; 340/438

(56) References Cited

U.S. PATENT DOCUMENTS

| | | | |
|---|---|---|---|
| 4,843,463 A | 6/1989 | Michetti | 348/148 |
| 5,193,124 A | 3/1993 | Subbarao | 382/255 |
| 5,528,698 A * | 6/1996 | Kamei et al. | 250/227.15 |
| 5,530,420 A | 6/1996 | Tsuchiya et al. | 340/435 |
| 5,559,695 A * | 9/1996 | Daily | 345/501 |
| 5,653,462 A | 8/1997 | Breed et al. | 280/735 |
| 5,670,935 A | 9/1997 | Schofield et al. | 340/461 |
| 5,835,613 A | 11/1998 | Breed et al. | 382/100 |
| 5,871,232 A | 2/1999 | White | 280/735 |
| 5,898,797 A | 4/1999 | Weiss et al. | 382/199 |
| 5,901,978 A | 5/1999 | Breed et al. | 280/735 |
| 5,926,568 A | 7/1999 | Chaney et al. | 382/217 |
| 5,930,379 A | 7/1999 | Rehg et al. | 382/107 |
| 5,983,147 A | 11/1999 | Krumm | 701/45 |
| 5,993,015 A * | 11/1999 | Fredricks | 359/839 |
| 6,005,958 A | 12/1999 | Farmer et al. | 382/103 |
| 6,020,812 A | 2/2000 | Thompson et al. | 340/438 |
| 6,023,535 A * | 2/2000 | Aoki | 382/264 |
| 6,039,139 A | 3/2000 | Breed et al. | 180/271 |
| 6,066,954 A | 5/2000 | Gershenfeld et al. | 324/671 |
| 6,116,640 A | 9/2000 | Tanaka et al. | 280/735 |
| 6,122,597 A * | 9/2000 | Saneyoshi et al. | 382/171 |
| 6,198,998 B1 * | 3/2001 | Farmer et al. | 340/438 |
| 6,215,518 B1 * | 4/2001 | Watkins | 296/37.6 |

FOREIGN PATENT DOCUMENTS

EP     0 781 689 A1    12/1996

* cited by examiner

*Primary Examiner*—Jacques H. Louis-Jacques
(74) *Attorney, Agent, or Firm*—George E. Haas; Quarles & Brady LLP

(57) ABSTRACT

A object on a seat of a motor vehicle is classified by creating a video image of the area and forming a silhouette of the object. The silhouette is divided into two segments and a separate ellipse is positioned to approximate the shape of each segment. The parameters that define the location and size of the two ellipses form a feature vector for the object. A Bayesian classification function utilizes the feature vector to determine the probability that the object fits which each of a plurality of classes. A class for the object is determined based on the probabilities. This method can be used to control operation of an air bag in the motor vehicle in response to the class of the object on the seat.

20 Claims, 2 Drawing Sheets

START → INITIALIZE PROCESSING (50) → ACQUIRE AN IMAGE (51) → CREATE IMAGE SILHOUETTE (52) → FIT FIRST AND SECOND ELLIPSES TO SILHOUETTE (54) → STORE ELLIPSE PARAMETERS AS A TEN DIMENSION FEATURE VECTOR (56) → APPLY A BAYESIAN CLASSIFIER TO THE FEATURE VECTOR (58) → USE CLASS RESULTS TO SEND A COMMAND TO THE CONTROL INTERFACE (59) → END

MOTOR VEHICLE OCCUPANT DETECTION SYSTEM EMPLOYING ELLIPSE SHAPE MODELS AND BAYESIAN CLASSIFICATION

BACKGROUND OF THE INVENTION

The present invention relates generally to classifying objects in an image, and more particularly to detecting whether an adult person, a child or an infant seat is present on a seat of a motor vehicle.

As a safety feature, modern motor vehicles incorporate an air bag inside the dashboard in front of a passenger in the forward seat. Additional air bags are being proposed for the doors to the sides of these occupants. Rapid deceleration of the motor vehicle during an accident is detected and activates inflation of the air bags which cushion the occupants.

Although air bags have greatly decreased the severity of injuries from motor vehicle collisions, people are occasionally injured because of the rapid rate with which the air bag must deploy. In particular, the air bag may severely injure a small child or infant sitting in the front seat of the vehicle.

As a consequence, it is now recommended that small children and infants ride in the rear seat of the vehicle so as not to be exposed to the force of air bag deployment in the event of an accident. However, that does not address the situation which occurs when that recommendation is ignored and a child rides in the front seat of the vehicle. Furthermore, in vehicles that do not have a rear seat, such as sports cars and trucks, a child or infant must be placed in a seat that faces an air bag. In this latter situation, it has been proposed to provide a manual override switch to disable the air bag in front of the child. However, not only must this switch be manually operated whenever a child is present, the motor vehicle operator must remember to re-activate the air bag for adult passengers.

These precautions also do not address the presence of a relatively small adult occupant in a vehicle with an air bag designed to protect an larger person. Thus there is a need for the air bags to be controlled dynamically in response to whether the person in the motor vehicle seat is an adult, a child or an infant in an special infant seat.

SUMMARY OF THE INVENTION

The present invention provides a mechanism for detecting the presence or absence of an occupant on a seat within a motor vehicle and classifying the type of person. The method also distinguishes inanimate objects on the seat from people.

An image of the object is acquired and then segmented into a first segment and a second segment. For example, the object is divided into the segments based on a demarcation line at a fixed position in all images that are processed. The first segment is substantially enclosed by a first geometric shape, such as an ellipse, that is defined by a first set of parameters. The second segment is substantially enclosed by a second geometric shape that is defined by a second set of parameters. The two sets of parameters are combined to form a feature vector that characterizes the object.

The feature vector is compared to template vectors, each representing different class of objects, to determine probabilities that the object falls within each class. In the preferred embodiment, a Bayesian classification technique is utilized to produce the set of probabilities. A class for the object is determined based on those probabilities. For example, the object is placed in the class that has the greatest probability.

However, if none of the probabilities exceeds a predefined threshold value, it is unlikely that the object fits into any of the predefined classes. In that case, the object is considered to be in the empty seat and irrelevant object class.

A process also is described for forming the template vectors for each of the predefined object classes.

The present invention has particular application in controlling an air bag in the motor vehicle. Specifically, this classification method can be used to determine whether the object on the seat is an adult person, child or an infant seat, and whether the infant seat is facing forward or rearward. This classification then is used to control whether the air bag inflates during an accident and if so, the speed of inflation so as to protect the seat occupant from injury by the air bag.

DETAILED DESCRIPTION OF THE INVENTION

Figure 1:
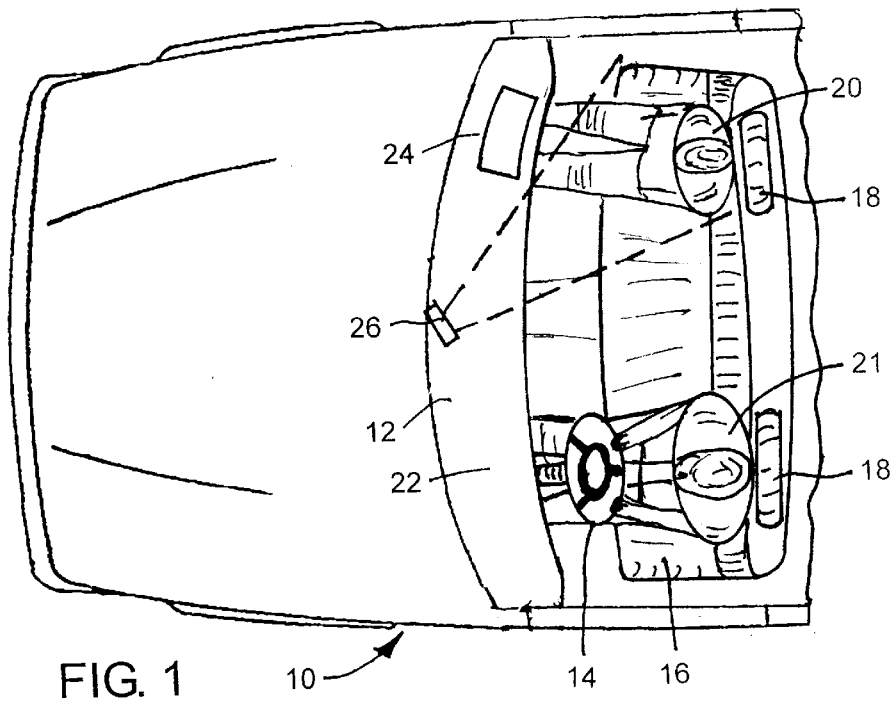
FIG. 1 is a view from above of the forward interior of a motor vehicle.

With reference to FIG. 1, the forward portion of the passenger compartment of an automobile 10 has a dashboard 12 from which a steering wheel 14 projects. A front seat 16 is spaced from the dashboard 12 and includes standard head rests 18 for both the passenger 20 and driver 21. It should be noted that the passenger 20 may be an adult, a child or an infant sitting in either a forward or rearward facing infant seat placed on the vehicle seat 16. The steering wheel 14 has a compartment which houses a first air bag 22 and a second air bag 24 is concealed in a compartment of the dashboard in front of the passenger 20.

A video camera 26 is mounted at the ceiling of the passenger compartment near the horizontal center of the windshield. The video camera 26 is aimed downward toward the seat area normally occupied by the passenger 20, as indicated by dashed lines, and produces a generally side view image of the passenger. Any of several commonly available video cameras may be used, such as a charge coupled device (CCD) imager or an active pixel sensor (APS). The video camera 26 can be responsive to visual light, but preferably is responsive to near infra-red light from sources (not shown) that are mounted above the windshield to illuminate the front seat 16 of the vehicle. Use of infra-red light allows operation of the present system at night without affecting an occupant's ability to see the road. In addition, the illumination fills-in image shadows during daytime operation.

Figure 2:
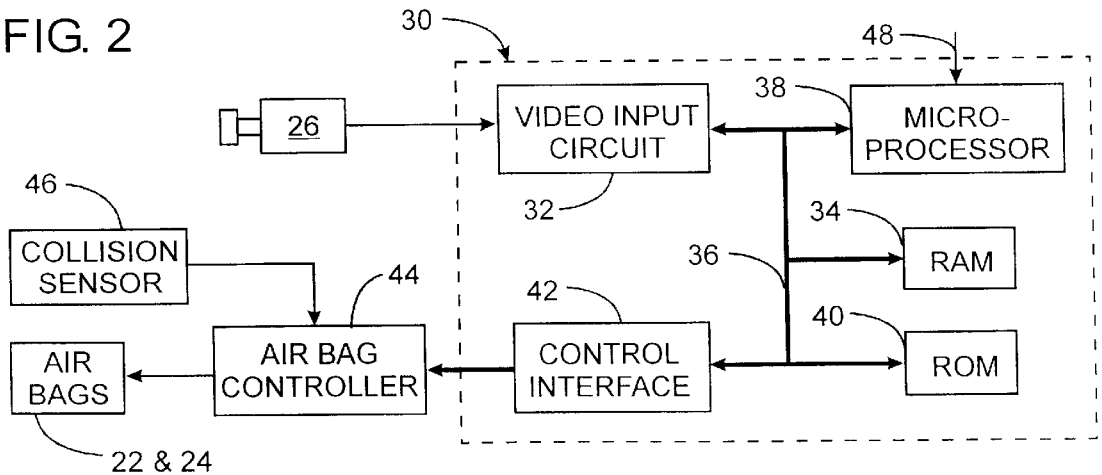
FIG. 2 is a block schematic diagram of an exemplary system for classifying objects within a motor vehicle.

With reference to FIG. 2, the images produced by the video camera 26 are applied to a video input circuit 32 of an image processor 30. Each video image consists of a two-dimensional array of picture elements (pixels). The video input circuit 32 controls storage of the pixels in a random access memory (RAM) 34 with both devices being connected to a set of signal buses 36. The RAM 34 also stores variable values, intermediate data, and final results produced the image analysis, as will be described. The analysis of the acquired images is controlled by a microprocessor 38 which executes a program that is stored in a read only memory (ROM) 40.

A control interface circuit 42 also is connected to the set of signal buses 36 and interfaces the image processor 30 to other components in the motor vehicle 10. In the exemplary system, the image analysis controls operation of the air bags 22 and 24 and the control interface circuit 42 is connected to the air bag controller 44 for the vehicle. The air bag controller 44 also receives a signal from a conventional collision sensor 46 when an accident occurs. The air bag controller 44 responds to these inputs by activating the driver and passenger air bags 22 and 24.

Figure 3:
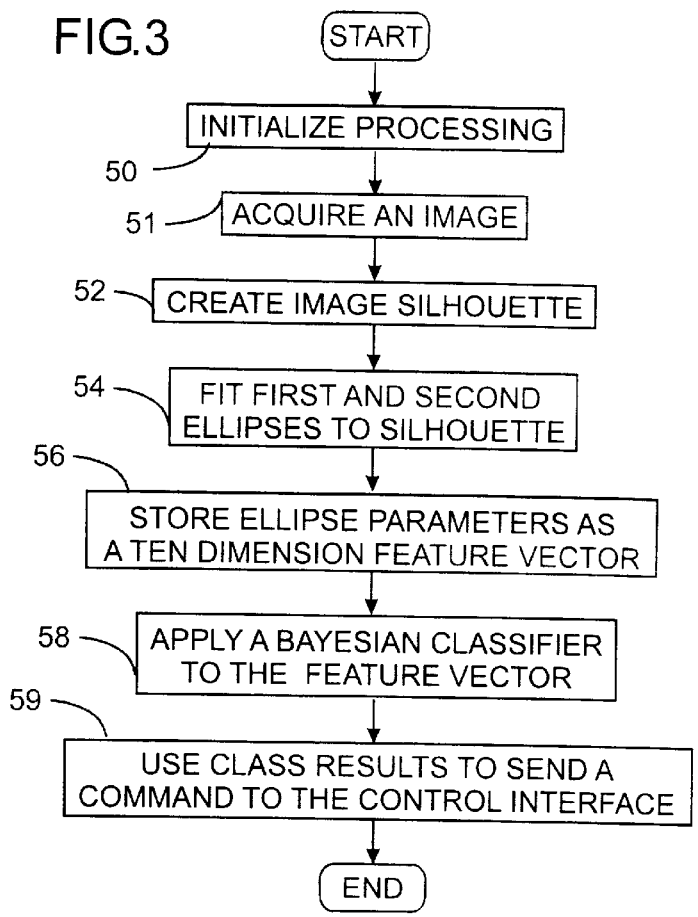
FIG. 3 is a flowchart of the method by which the images are processed by the object classification system.

With reference to FIG. 3, the image analysis commences each time a passenger sits in the right side of the front seat 16 of the motor vehicle 10. For example, microprocessor 38 receives a signal on input line 48 which indicates when all of the doors of the vehicle close after any one of them has been open. This can be accomplished by sensor switches (not shown) mounted on the jam of each door. Alternatively, the image analysis process can occur during operation of the vehicle at periodic intervals defined by a timed interrupt of the microprocessor 38. Regardless of the mechanism used to trigger image processing, program execution starts with an initialization step 50 at which variables and other parameters used in the processing are set to initial values. The program then advances to step 51 where a new image of the passenger area of the vehicle is acquired. Specifically, the microprocessor 38 issues a command to the video input circuit 32 that causes the camera 26 to produce an image which then is stored pixel by pixel within the RAM 34. At this point, each pixel has a numerical value defining the gray scale brightness level for the corresponding location within the image.

The image processing then advances to step 52 where the recently acquired gray scale image is transformed to produce a silhouette of any object on the seat. Techniques for this transformation are described by W. K. Pratt in *Digital Image Processing*, 2nd Ed., John Wiley & Sons, London, 1991. One technique, first separates the portion of the image that corresponds to the occupant from the background by storing a reference image of the empty seat into the memory of the image processor 30. That reference image is subtracted on a pixel by pixel basis from a newly acquired image to produce a difference image. Pixels in that difference image have a relatively large value where the corresponding portion of the newly acquired image is very different from the reference image of an empty seat, i.e. the portion where an object is present on the seat. Next, the pixels of the difference image are compared to a threshold value to form a binary image by converting the pixels with values above the threshold value to a value of one and converting the other pixels to zero. In the resultant binary image, pixels of the object have a value of one and the remaining pixels are zero, thereby forming a silhouette of any object or person that is present on the passenger side of the motor vehicle seat 16.

Figure 4:
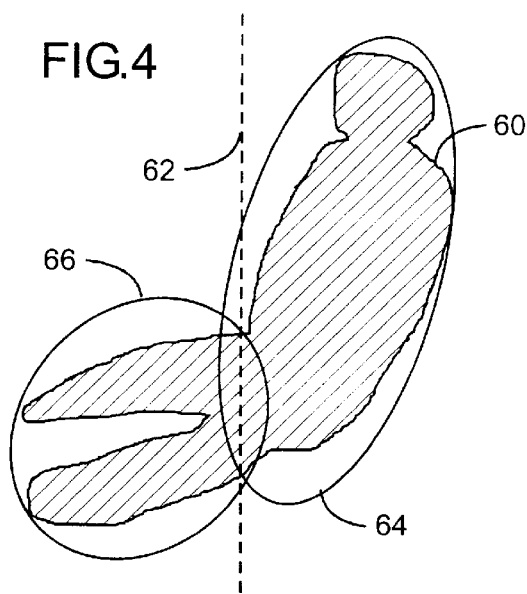
FIG. 4 depicts a step of the image processing.

In order to classify that object or person, features that reflect the shape of the silhouette must be extracted from the image. It is recognized that a person seated in the passenger area of the vehicle will have a generally L-shaped silhouette, such as shown by silhouette 60 in FIG. 4. This silhouette can be characterized by a pair of ellipses 64 and 66 that approximate the shape of a segment of the object. The first ellipse 64 substantially encloses to the torso and head of the passenger 20, while the second ellipse 66 substantially encloses the lower portion of the passenger's body. The use of a single ellipse to enclose an object in an image being processed is well known as described by W. K. Pratt, supra.

This is a modification of the technique in that two ellipses are employed for different segments of the object. In other words, the silhouette is decomposed into a pair of geometric shapes that provide a more precise representation of the object. It should be understood that the application of each ellipse to the respective segment of the silhouette is a best-fit approximation of the ellipse to that segment of the object. A few outlier pixels, which jut out from the main body of the silhouette, may not be enclosed by the corresponding ellipse. Thus fitting each ellipse to the respective segment of the silhouette substantially encloses the corresponding portion of the object. In this manner the size and shape of the ellipse approximates a portion of the object. Although the preferred embodiment of the present invention uses ellipses, other geometric shapes such as a circle or a regular polygon could be employed.

Specifically, the microprocessor 38 divides the image into left and right portions about a fixed imaginary vertical demarcation line 62. The position of the demarcation line is specified in terms of horizontal pixel locations in the image, and corresponds to the location in the image where the legs meet torso of a typical passenger seated in the motor vehicle 10. It will be understood that this demarcation line 62 may not always correspond to the junction between the legs and torso of every passenger seated in the vehicle as the actual body dimensions differ among people and that junction is shifted in the image as the seat 16 is moved forward and backward. The relative shift in the location of that physical junction due to different body sizes and seat positions is a relatively small amount (e.g. a maximum of six inches in a typical automobile) and corresponds to a shift of only a few pixels with the image. Therefore, the fact that the fixed demarcation line 62 does not always fall exactly on the junction between the passenger's legs and torso does not significantly affect the image processing results.

Each ellipse 64 and 66 is positioned and sized to enclose the segment of the silhouette that is on one side or the other of line 62. It has been found that two ellipses provide a reasonable model for differentiating between different types of occupants and objects in the passenger area of the vehicle in order to properly control the air bags. For example, this allows the image processor to determine whether the object in the passenger seating area is an adult, a child, a forward facing infant seat (FFIS) or a rearward facing infant seat (RFIS).

Figure 5:
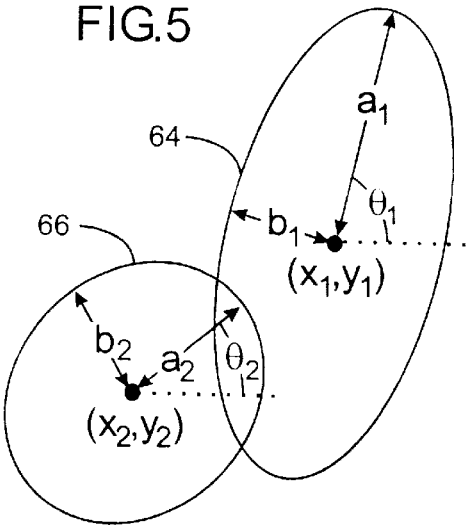
FIG. 5 illustrates parameters of a pair of ellipses which have been defined in the image by the processing step depicted in FIG. 4.

After each ellipse 64 and 66 is fitted to the respective segment of the silhouette at step 54, the parameters defining each ellipse are stored within the RAM 34 at step 56. As depicted in FIG. 5, each ellipse is defined by a five dimensional feature vector having the parameters of horizontal and vertical coordinates (x,y) for the center in the image, the length (a) of the major axis, the length (b) of the minor axis, and an angle φ between the major axis and image horizontal. The image processor 30 computes these five parameters for each ellipse 64 and 66, which then are combined to form a ten dimension feature vector (x) of the silhouette being analyzed:

$$x = (x_1, y_1, a_1, b_1, \phi_1, x_2, y_2, a_2, b_2, \phi_2) \tag{1}$$

At step 58, the image processing enters a phase in which the feature vector x is compared to template vectors for each of the four object classes to determine the class of the object. At the moment, the empty seat and irrelevant object class is ignored. The object classification process may be cast in a Bayesian framework, in which a model prescribes a prior distribution of objects into the four classes (adult, child, FFIS, RFIS) and a likelihood function describes how well the ellipse parameters derived from the image are in accord with each class. This is a typical pattern recognition problem where a general solution utilizes a set of decision functions.

Specifically, each class is denoted as a decision function $d_k(x)$, where k equals 1,2,3,4 denoting the associated class. Then, the feature vector x can be classified based on the decision rule:

Assign $x$ to class $k_0$ if $d_{k0}(x) > d_k(x)$ for all $k \neq k_0$.

In this rule, $d_{k0}(x)$ is the Bayesian classification value of an exemplary vector for the respective class. In this case, the ten dimension feature vector x is assigned to the class which has the maximum decision function value, i.e. the greatest probability.

The optimal form of the decision function that minimizes the probability of classification error is given by:

$$d_k(x) = \log p_k(x) + \log P[k], \quad k=1,2,3,4 \qquad (2)$$

where $P_k(x)$ is the conditional probability density function of x given that it has come from class k, and P[k] is the prior probability of class k. In the present object classification system, the term P[k] has a constant value of 0.25, as the unknown object is equally likely to be in any one of the four classes. If that is not the case in a given application of the instant technique, other values for P[k] may be utilized. A multi-variate Gaussian model is used for $p_k(x)$ as given by:

$$p_k(x) = (2\pi)^{-10/2} |c_k|^{-\frac{1}{2}} e^{-\frac{1}{2}(x-m_k) c_1^{-1}(x-m_k)} \qquad (3)$$

where $m_k$ and $C_k$ are the mean vector and covariance matrix, respectively, for class k.

The mean vector and covariance matrix for every possible class are estimated from training images. In the case of the air bag control system, a plurality of different objects in each class are placed on the seat and an image of each one is produced. Suppose that $x_1, x_2, x_3, \ldots, x_n$ are the two-ellipse feature vectors extracted from n training images of the adult class (k=3), then estimates of the mean vector $m_k$ and covariance matrix $C_k$ are given by:

$$m_3 \cong \frac{1}{n} \sum_{i=1}^{n} x_i \qquad (4)$$

$$C_3 \cong \frac{1}{n} \sum_{i=1}^{n} (x_i - m_3)(x_i - m_3)^t$$

Thus a set of templates is developed for a typical silhouette in each class.

Thus the application of the Bayesian classifier function to the feature vector x produces a probability that the present silhouette fits within each of the object classes. A preliminary determination as to the type of object on the seat(adult, a child, a forward facing infant seat,) or a rearward facing infant seat) then is reached based on the class having the greatest probability.

However, there remains the situation where the seat is empty or contain an irrelevant object, such as a grocery bag, which does not fall within any of the expected classes. If the Bayesian classifier assigns the ten dimension feature vector to the first class $k_0$ (for example the FFIS object class), then $d_k(x)$ achieves a maximum value for k equal to $k_0$. However, if the probability $d_{k0}(x)$ is smaller than a predefined threshold value, a determination is reached that there is insufficient evidence that the ten dimension feature vector belongs to any one of the four classes. In this case, the reasonable determination is to assign the feature vector to the empty and the irrelevant object class.

Once the class of the object has been determined at step 58, that information can be used to formulate a command that is sent at step 59 to the control interface 42 to provide information to the air bag controller 44. For example, if the air bag controller is informed that a forward facing infant seat (FFIS) or a rear facing infant seat (RFIS) is present on the seat, the air bag controller 44 inhibits inflating the passenger side air bag 24 in the event of an accident. Similarly, if a determination is made that a child may be present in the passenger seating area, the air bag controller 44 inflates the air bag during an accident at a much slower rate than for an adult.

What is claimed is:

1. A method for classifying a object that is present within a motor vehicle, that method comprising:
   acquiring an image of the object;
   segmenting the object into a first segment and a second segment;
   approximating the first segment with a first geometric shape which is selected from a group consisting of a circle, an ellipse, and a regular polygon and which is defined by a first set of parameters;
   approximating the second segment with a second geometric shape which is selected from a group consisting of a circle, an ellipse, and a regular polygon and which is defined by a second set of parameters;
   forming a feature vector from the first and second sets of parameters;
   comparing the feature vector to plurality of template vectors, each representing different class of objects, to determine probabilities that the object falls within each class; and
   classifying the object in response to the probabilities.

2. The method as recited in claim 1 wherein comparing the feature vector to plurality of template vectors utilizes a Bayesian classification function.

3. The method recited in claim 1 further comprising classifying the object in a given object class when none of the probabilities exceeds a predetermined value.

4. The method as recited in claim 1 wherein the first geometric shape and the second geometric shape are both ellipses.

5. The method as recited in claim 4 wherein the first set of parameters and the second set of parameters each comprises a location of a center, a major axis length, a minor axis length, and an rotation amount for the respective ellipse.

6. The object detection system as recited in claim 1 wherein segmenting the object comprises defining a portion of the object on one side of a demarcation line in the image as the first segment, and defining another portion of the object on another side of the demarcation line as the second segment.

7. The method as recited in claim 6 further comprising predefining the demarcation line for use with all images produced by the camera.

8. The method as recited in claim 1 further comprising defining each of the plurality of template vectors by producing a feature vector for at least one exemplary object in a respective class of objects.

9. The method as recited in claim 1 wherein classifying the object comprises determining whether the object is an adult person, child or an infant seat.

10. The method recited in claim 9 wherein classifying the object further comprises determining whether the infant seat is facing forward or rearward in the motor vehicle.

11. The method as recited in claim 1 further comprising controlling a mechanism in the motor vehicle in response to classifying the object.

12. The method as recited in claim 1 further comprising controlling an air bag in the motor vehicle in response to classifying the object.

13. A method for classifying a object that is present on a seat of a motor vehicle and controlling an air bag in response to the classifying, that method comprising:

acquiring an image of an interior of the motor vehicle;

extracting a portion of the image which corresponds to an object on the seat;

dividing the object into a first segment and a second segment;

substantially enclosing the first segment with a first ellipse that has a shape specified by a first set of parameters;

substantially enclosing the second segment with a second ellipse that has a shape specified by a second set of parameters;

forming a feature vector from the first and second sets of parameters;

comparing the feature vector to a plurality of template vectors representing different classes of objects to determine probabilities that the object falls within each class;

classifying the object into one of the different classes of objects in response to the probabilities; and controlling operation of the air bag in response to classifying the object.

14. The method as recited in claim 13 wherein the plurality of template vectors represents an adult person, a child, and an infant seat.

15. The method recited in claim 13 wherein the plurality of template vectors represents an adult person, child, a forward facing infant seat and a rearward facing infant seat.

16. The method recited in claim 13 wherein extracting a portion of the image which corresponds to an object comprises creating a silhouette of the object.

17. The method as recited in claim 13 wherein the first set of parameters and the second set of parameters each comprises a location of a center, a major axis length, a minor axis length, and an rotation angle for the respective ellipse.

18. The method as recited in claim 13 further comprising predefining the demarcation line within all images produced by the camera; and wherein dividing the object defines the first segment as a portion of the object on one side of a demarcation line, and defines the second segment as a portion of the object on another side of a demarcation line.

19. The method as recited in claim 13 further comprises defining each of the plurality of template vectors by producing a feature vector from at least one exemplary object in a respective class of objects.

20. The method recited in claim 13 further comprising classifying the object is a given object class when none of the probabilities exceeds a predetermined value.

* * * * *